(12) United States Patent
Fahrbach

(10) Patent No.: US 12,474,560 B2
(45) Date of Patent: Nov. 18, 2025

(54) OPTICAL DEVICE, RETROFITTING SET AND METHOD FOR PRODUCING LIGHT SHEETS BY MEANS OF A REFLECTOR

(71) Applicant: LEICA MICROSYSTEMS CMS GMBH, Wetzlar (DE)

(72) Inventor: Florian Fahrbach, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 403 days.

(21) Appl. No.: 18/020,097

(22) PCT Filed: Aug. 16, 2021

(86) PCT No.: PCT/EP2021/072734
§ 371 (c)(1),
(2) Date: Feb. 7, 2023

(87) PCT Pub. No.: WO2022/034246
PCT Pub. Date: Feb. 17, 2022

(65) Prior Publication Data
US 2023/0314783 A1 Oct. 5, 2023

(30) Foreign Application Priority Data
Aug. 14, 2020 (DE) ...................... 10 2020 210 370.4

(51) Int. Cl.
*G02B 21/06* (2006.01)
(52) U.S. Cl.
CPC .................................. *G02B 21/06* (2013.01)
(58) Field of Classification Search
CPC .... G02B 21/06; G02B 21/00; G02B 21/0004;
G02B 21/002; G02B 21/0028; G02B 21/0036; G02B 21/0052; G02B 21/006; G02B 21/0076; G02B 21/36; G02B 21/361
USPC ........ 359/385, 362, 363, 368, 369, 390, 434
See application file for complete search history.

(56) References Cited

U.S. PATENT DOCUMENTS

| | | | |
|---|---|---|---|
| 11,048,078 | B2 | 6/2021 | Fahrbach et al. |
| 2010/0193673 | A1 | 8/2010 | Power et al. |
| 2016/0320290 | A1 | 11/2016 | Skupsch |
| 2017/0131534 | A1 | 5/2017 | Lippert et al. |

(Continued)

FOREIGN PATENT DOCUMENTS

| | | |
|---|---|---|
| DE | 102007047464 A1 | 4/2009 |
| DE | 102015214302 A1 | 11/2016 |
| JP | 11337867 A  * | 12/1999 |

(Continued)

*Primary Examiner* — Arnel C Lavarias
(74) *Attorney, Agent, or Firm* — LEYDIG, VOIT & MAYER, LTD.

(57) ABSTRACT

An optical device for a microscope includes a reflector assembly including a beam entrance, at which a light beam can be coupled into the reflector assembly, including a beam exit, and including a beam path extending within the reflector assembly. The beam path begins in the reflector assembly at the beam entrance and passes the beam exit multiple times. On each passage of the beam path, partial beams are coupled out of the reflector assembly at the beam exit. The partial beams coupled out at the beam exit either extend in parallel and so as to be spaced apart from one another or are directed out of the reflector assembly starting from a common starting point.

18 Claims, 7 Drawing Sheets

(56) References Cited

U.S. PATENT DOCUMENTS

2019/0361213 A1  11/2019  Fahrbach

FOREIGN PATENT DOCUMENTS

| JP | 2005191427 A * | 7/2005 |
| JP | 2019/523456 A | 8/2019 |
| WO | WO 2014009080 A1 | 1/2014 |
| WO | WO 2018050888 A1 | 3/2018 |
| WO | WO-2020030420 A1 * | 2/2020 |
| WO | 2020/063895 A1 | 4/2020 |

* cited by examiner

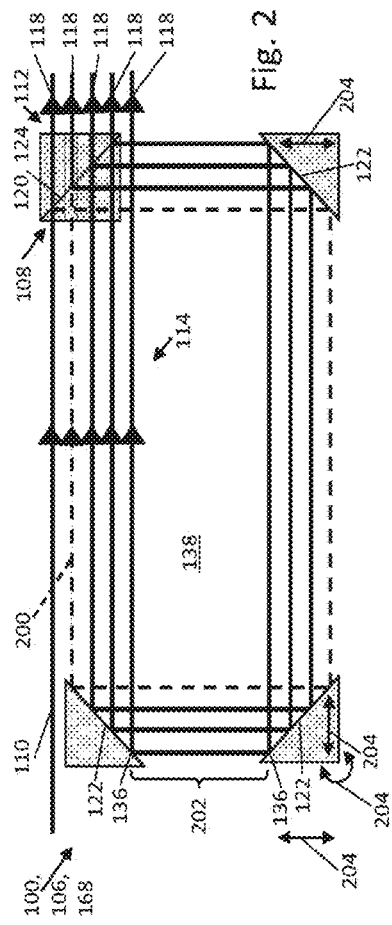
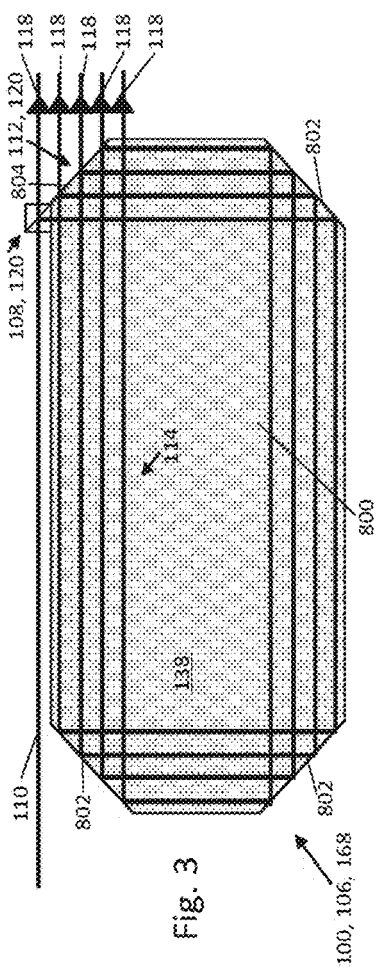
Fig. 2
Fig. 3

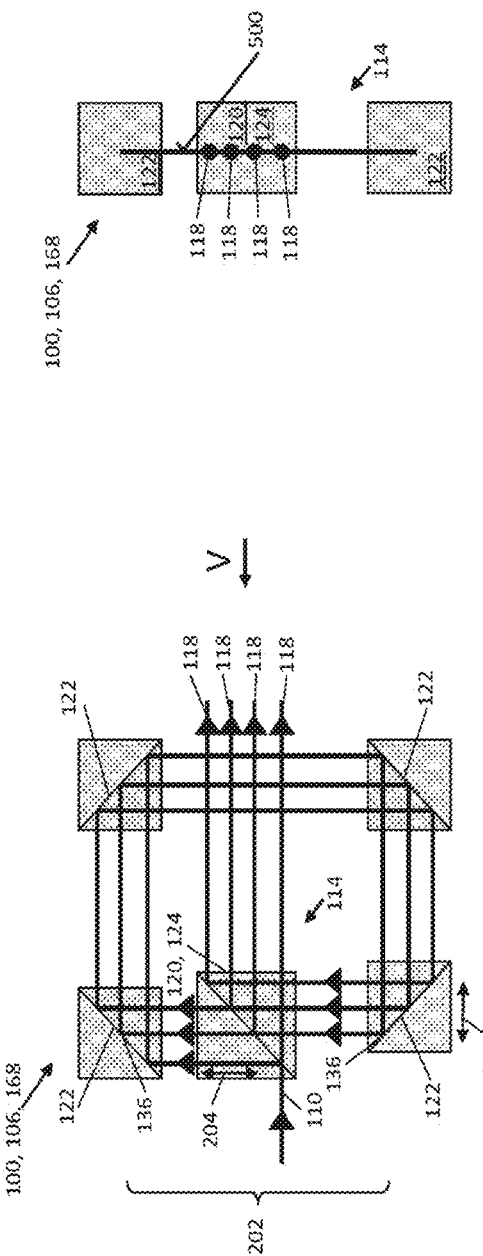

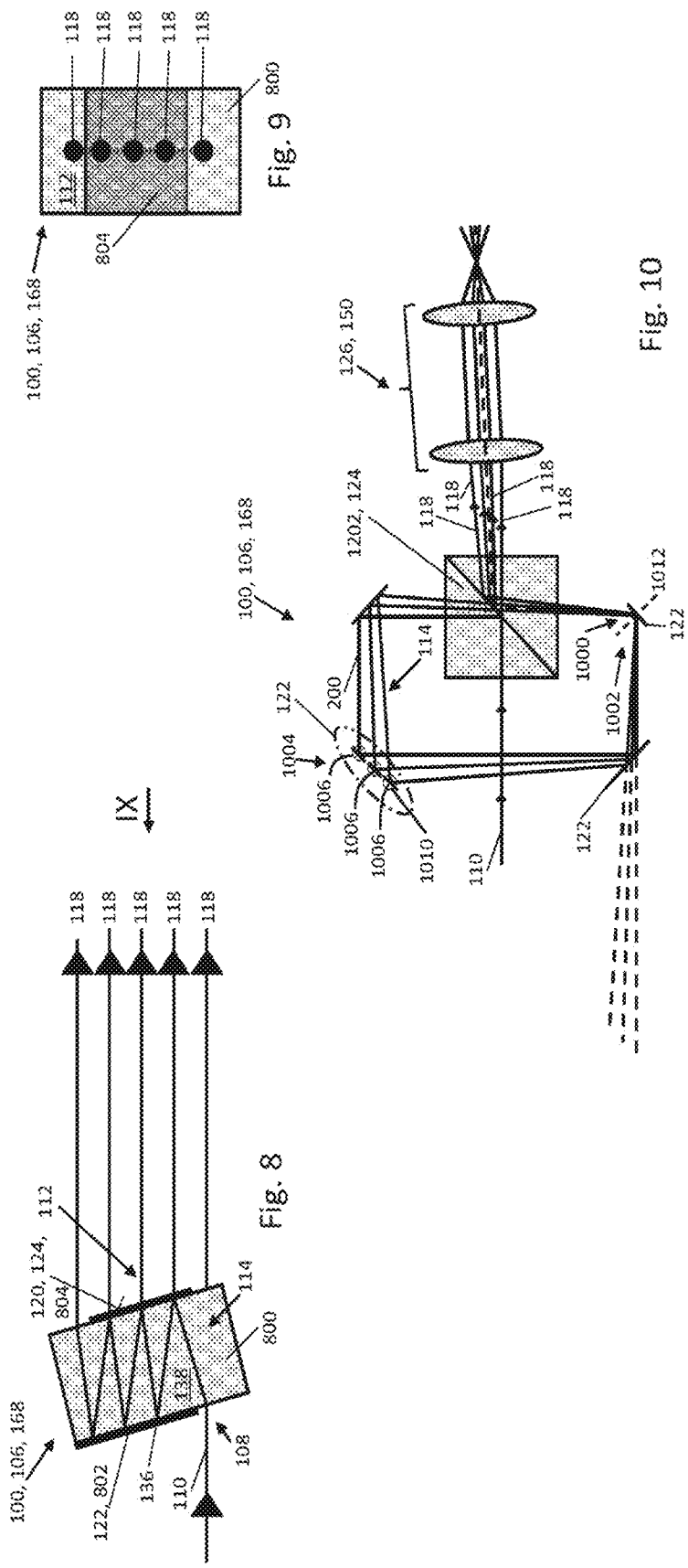

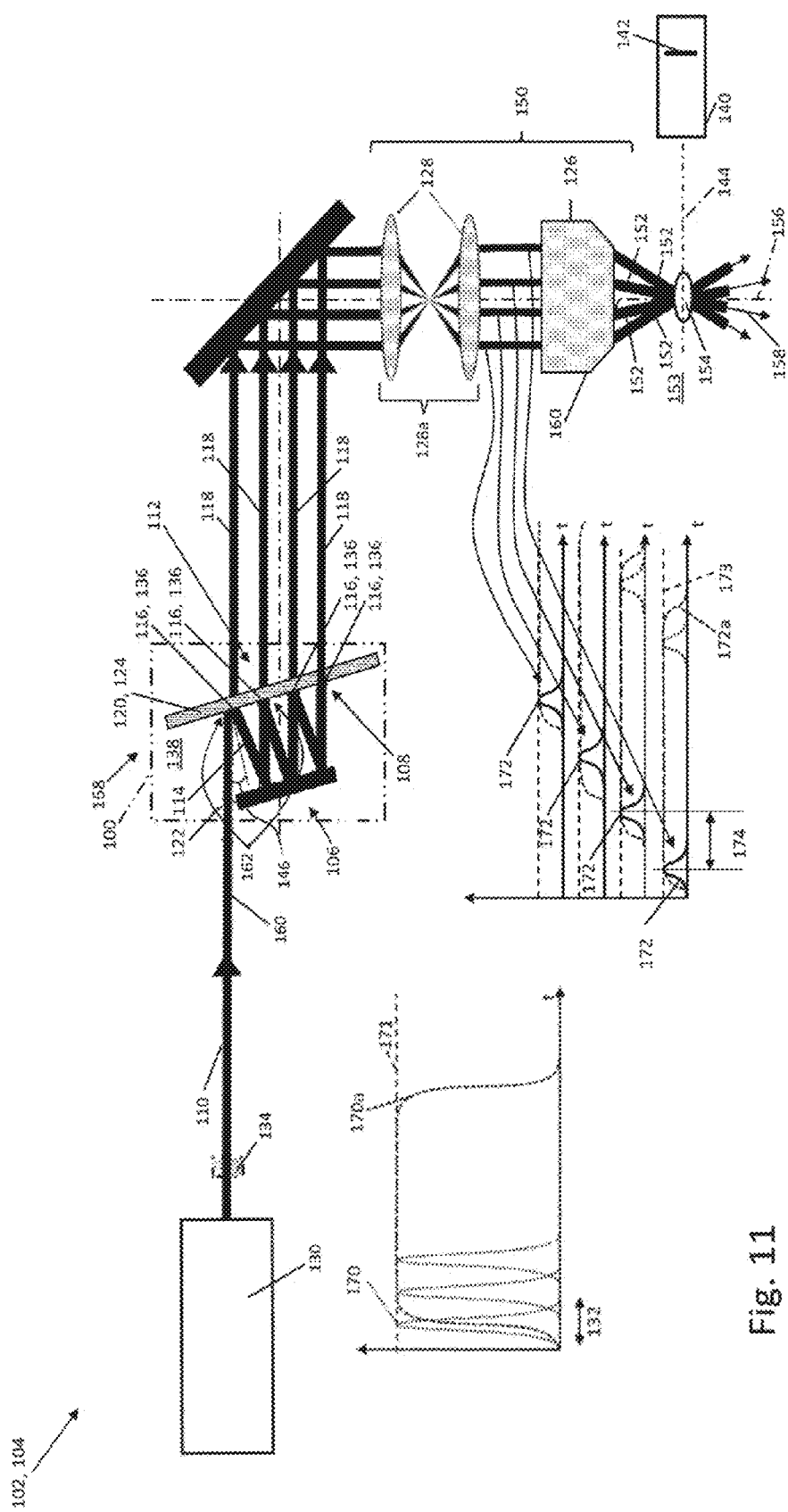

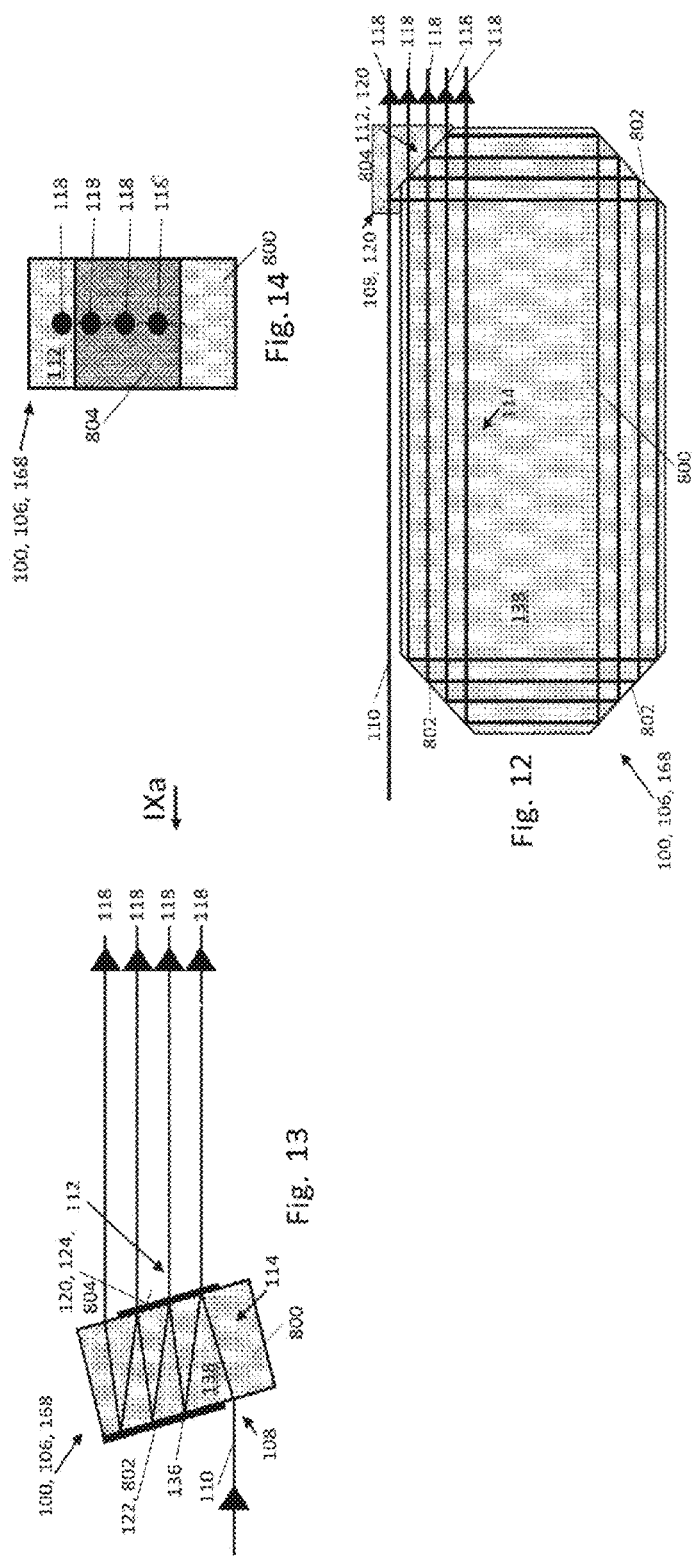

OPTICAL DEVICE, RETROFITTING SET AND METHOD FOR PRODUCING LIGHT SHEETS BY MEANS OF A REFLECTOR

CROSS REFERENCE TO RELATED APPLICATIONS

This application is a U.S. National Phase application under 35 U.S.C. § 371 of International Application No. PCT/EP2021/072734, filed on Aug. 16, 2021, and claims benefit to German Patent Application No. DE 10 2020 210 370.4, filed on Aug. 14, 2020. The International Application was published in German on Feb. 17, 2022 as WO 2022/034246 A1 under PCT Article 21(2).

FIELD

The invention relates to an optical device for a microscope, in particular a light sheet microscope; to a retrofit kit for a light sheet microscope comprising an optical device of this kind; to the use of a reflector assembly for producing light sheets in a light sheet microscope; and to a method for automatically producing light sheets.

BACKGROUND

In microscopy, light sheets can be used to illuminate thin layers of a sample while the remainder of the sample remains unilluminated. This increases the image quality, since the unfocused regions remain unilluminated.

Producing a plurality of different light sheets opens up a range of further applications: in order to obtain a three-dimensional image of the sample, a plurality of preferably parallel light sheets, each illuminating different layers of the sample, are produced consecutively. In order to prevent any shadowing or refraction in a light sheet, a plurality of coplanar light sheets illuminating the same layer from different directions are produced.

Irrespective of whether the plurality of light sheets are intended to illuminate a plurality of layers consecutively or the same layer from different directions, complex, expensive, and, above all, error-prone mechanisms, such as moving mirrors, are used to produce said light sheets.

SUMMARY

In an embodiment, the present disclosure provides an optical device for a microscope. The optical device includes a reflector assembly including a beam entrance, at which a light beam can be coupled into the reflector assembly, including a beam exit, and including a beam path extending within the reflector assembly. The beam path begins in the reflector assembly at the beam entrance and passes the beam exit multiple times. On each passage of the beam path, partial beams are coupled out of the reflector assembly at the beam exit. The partial beams coupled out at the beam exit either extend in parallel and so as to be spaced apart from one another or are directed out of the reflector assembly starting from a common starting point.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 2 is a schematic illustration of a further device;
FIG. 3 is a schematic illustration of a further device;
FIG. 4 is a schematic illustration of a further optical device;
FIG. 5 is a view of FIG. 4 in the direction of the arrow V;
FIG. 8 is a schematic illustration of a further optical device;
FIG. 9 is a view of FIG. 8 in the direction of the arrow IX;
FIG. 10 is a schematic illustration of a further optical device;
FIG. 11 is a further schematic illustration of an optical device in a light sheet microscope;
FIG. 12 is a schematic illustration of a further device;
FIG. 13 is a schematic illustration of a further optical device;
and
FIG. 14 is a view of FIG. 13 in the direction of the arrow IXa.

DETAILED DESCRIPTION

Figure 1:
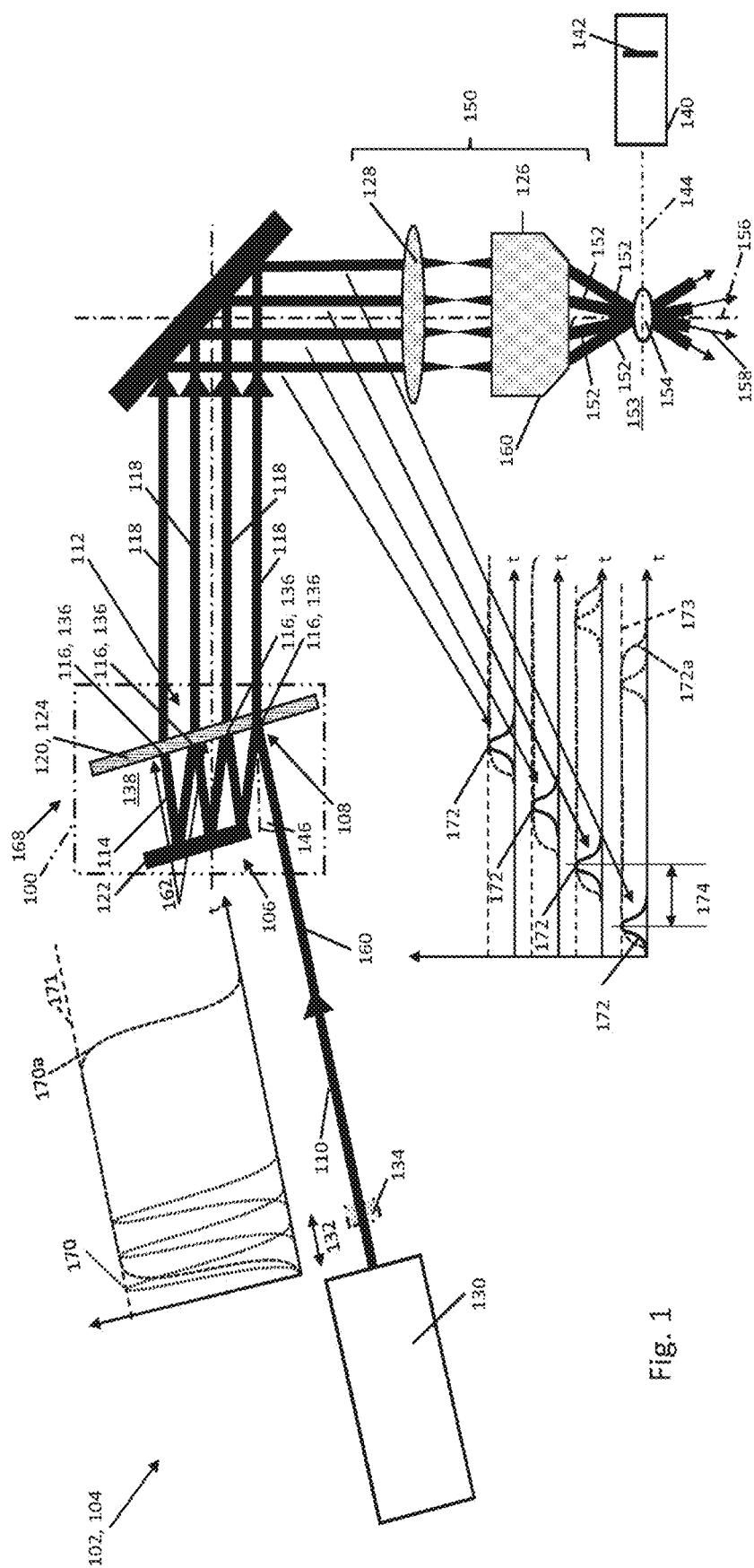
FIG. 1 is a schematic illustration of an optical device in a light sheet microscope.

Embodiments of the present invention provide a simpler, more reliable, and, above all, more cost-effective option for producing a plurality of light sheets.

In an embodiment of the optical device according to the present invention, the optical device comprises a reflector assembly having a beam entrance, at which a light beam can be coupled into the reflector assembly, having a beam exit, and having a beam path extending within the reflector assembly, wherein the beam path begins in the reflector assembly at the beam entrance and passes the beam exit multiple times, wherein, on each passage of the beam path, a partial beam is coupled out of the reflector assembly at the beam exit, and wherein the partial beams coupled out at the beam exit either extend in parallel and so as to be spaced apart from one another or are directed out of the reflector assembly starting from a common starting point.

The retrofit kit mentioned at the outset comprises an optical device of this kind and is configured such that it can be arranged in an illumination beam path of a light sheet microscope.

Advantages are also achieved by the use, in a light sheet microscope, of a reflector assembly having a beam entrance, a beam exit, and a beam path which is located in the reflector assembly, begins at the beam entrance, and passes the beam exit multiple times, wherein, on each passage of the beam exit, a partial beam is coupled out of the reflector assembly, and wherein the partial beams coupled out at the beam exit either extend in parallel and so as to be spaced apart from one another or start from a common apparent starting point.

Lastly, Advantages are also achieved by a method for automatically producing light sheets having different propagation directions from a light beam, wherein the method comprises the following method steps: coupling the light beam into a reflector assembly; reflecting the light beam in the reflector assembly multiple times, wherein the light beam impinges multiple times on a beam exit of the reflector assembly, where it is reflected back into the reflector assembly in part; coupling a partial beam directed out of the reflector assembly out of the light beam reflected in the reflector assembly at the beam exit when the light beam impinges on the beam exit in the reflector assembly, wherein either the coupled-out partial beam extends in parallel with and so as to be spaced apart from a previously coupled-out partial beam or the coupled-out partial beam and a previously coupled-out partial beam start from a common starting point; and producing differently oriented light sheets from the coupled-out partial beams.

The optical device according to an embodiment of the invention, the retrofit kit according to an embodiment of the invention, the use according to an embodiment of the invention of the reflector assembly in a light sheet microscope, and the method according to an embodiment of the invention can achieve the above-mentioned advantages in that, instead of a mechanism, the reflector assembly produces the different partial beams from a single light beam by reflection using optical means, the differently oriented light sheets then being produced from the different partial beams. The reflector assembly operates without wear and produces the light sheets at a higher speed than a mechanism.

The expression 'partial beam' or 'light beam' refers not only to the specific electromagnetic wave or photon beam that propagates in the beam direction, but also, in the sense of geometric optics, to the optical axis along which the electromagnetic wave or photon beam moves or would move, without any such electromagnetic wave or photon beam having to be present. In the reflector assembly, the light beam moves along the beam path. The beam path thus refers to the path covered by a light beam in the reflector assembly.

Developments of the above subject matter and the respective technical effects are explained in the following. Each of the individual developments in themselves can be combined with one another advantageously, as desired, and separately. In particular, the developments below can be used separately from one another for improving both the device and the method.

For example, the beam exit can be punctiform or sheet-like and/or can comprise a plurality of spaced-apart regions that are, for example, punctiform or sheet-like. The beam exit generally denotes those portions of the reflector assembly at which the partial beams emerge from the reflector assembly.

A beam splitter can be located at the beam exit, thereby ensuring that the light beam remains in the reflector assembly in part. By way of example, the beam splitter can comprise one or more partially transmitting mirrors.

The beam entrance can spatially overlap with the beam exit or spatially coincide with the beam exit. By way of example, a compact structure is possible when the beam entrance and beam exit spatially coincide because the light beam enters the reflector assembly at the same site at which it is coupled out.

A compact structure can also be obtained when at least one partial beam emerges from the reflector assembly in the extension of the light beam coupled into the reflector assembly and/or the partial beams leave the reflector assembly in the same direction in which the light beam enters the reflector assembly.

The beam path in the reflector assembly comprises a plurality of deflecting sites, at which it changes direction. A mirror assembly is located at each deflecting site. In this case, as already explained above, at least one mirror assembly can comprise a beam splitter. Mirrors that fully reflect the light beam are, in a preferred embodiment, located at the remaining deflecting sites.

A partially transmitting mirror can have different reflectivity over its surface. For instance, the reflectivity can be greater at one deflecting site than the reflectivity at a further deflecting site downstream in the beam path. This makes it possible to couple out partial beams of the same intensity.

In its simplest configuration, the beam path comprises at least one deflecting site at which it is fully deflected toward the beam exit, as well as a partial reflection at the beam exit, at which the beam path is deflected back into the reflector assembly. The beam entrance can be deflected at least once at the beam exit. For example, a simple configuration of this kind can comprise two opposite, plane-parallel mirrors, one of which is partially transmitting.

The light beam coupled into the reflector assembly is, in a preferred embodiment, collimated. The light beam is also intended to be collimated along the entire beam path in the reflector assembly. In addition, the partial beams emerging from the reflector assembly are intended to be collimated. As a result of each of these measures per se, the light sheets produced from the light beams can be sharply delineated and precisely focused.

For it to be possible to precisely focus the light sheets, according to an advantageous configuration, a refractive element, in particular a lens, is not located in the beam path.

The beam path can be located in a gas or a vacuum. For instance, the reflector assembly can have a sealed volume which is filled with gas or contains a vacuum and in which the beam path extends. Alternatively, the beam path can also extend in a glass body. For instance, the reflector assembly can be monolithically manufactured from a glass block.

The reflector assembly can comprise a prism. The deflecting sites in the reflector assembly can be formed by reflective surfaces of the glass block.

The mirrors at the deflecting sites are planar in a preferred embodiment, such that in particular the light beam reflected along the beam path in the reflector assembly remains collimated.

At least one mirror can be arranged to be tilted relative to another mirror about at least two spatial axes, which are in particular perpendicular to one another. This makes it possible to produce an additional lateral offset in the beam path. By means of a lateral offset of this kind, the geometric position and orientation of the partial beams emerging from the reflector assembly can be adapted to the structural requirements.

According to a further advantageous configuration, at least one mirror can be movable relative to at least one other mirror of the reflector assembly. In particular, a manually operated or motor-driven adjusting apparatus can be provided to move the at least one mirror relative to the at least one other mirror. A movement of this kind may be a tilting movement, i.e., rotation about at least one spatial axis, and/or a translational movement along at least one spatial axis.

After one passage, the beam path has, in a preferred embodiment, passed all the deflecting sites of the reflector assembly. In this configuration, the light beam passes through the entire reflector assembly before each coupling-out of a partial beam. In a preferred configuration, in this case the length of the beam path is constant between successive passages of the beam exit. This means that the path length difference between two successive partial beams is constant. In this context, the path length difference is the difference in the path lengths covered by two different partial beams in the reflector assembly.

In one configuration, at least one mirror assembly can be provided which comprises partial mirrors that are tilted relative to one another. In this case, each partial mirror is preferably planar. The individual partial mirrors can be separate components or facets of a monolithic mirror body. In a configuration of this kind, the beam path can be reflected by a different partial mirror on each pass through the reflector assembly.

The light beams reflected by the partial mirrors on each pass can be directed toward a common point. This produces the effect in the reflector assembly whereby all the partial beams start from a common point. If the partial mirrors are planar, the light beams starting from the common point and/or running toward the common point remain collimated if the incoming light beam was collimated.

The partial mirrors are, in a preferred embodiment, tilted relative to one another about parallel spatial axes, in particular about just one spatial axis. The use of just one spatial axis makes it easier to adjust and geometrically configure the reflector assembly. Each partial mirror, in a preferred embodiment, comprises exactly one deflecting site, i.e., the beam path passes it just once. The individual partial mirrors are, in a preferred embodiment, tilted relative to one another about the same spatial axis in each case. In particular, each two adjacent partial mirrors which the beam path passes can be tilted relative to one another by the same spatial angle.

According a further advantageous configuration, the beam path passes through the reflector assembly multiple times. In this case, the beam path can pass the beam exit once on each pass. Here, the first pass extends from the beam entrance to the beam exit, at which the first partial beam is coupled out. Each further pass then extends from the beam exit back to the beam exit, with each further pass having at least one reflection by a deflecting site.

The individual passes of the beam path are, in a preferred embodiment, spaced apart from one another at least in some portions. This means that the partial beams are also spaced apart from one another at the beam exit and can thus be used in a simple manner to produce differently oriented light sheets.

The beam path or all the passes of the beam path can lie in one plane. On each pass the beam path can be offset in parallel from the previous pass. The beam path in the reflector assembly can be helical or spiral-shaped.

The beam path can comprise at least one site which the beam path passes on each pass and which, for example, forms the common starting point. The common starting point is, in a preferred embodiment, located in the reflector assembly, but can also be located outside the reflector assembly. This kind of arrangement is useful, for example, if a telecentric optical system is used. In that case, the common starting point can be positioned in the back focal plane or in a plane of the telecentric optical system optically conjugated relative thereto. The telecentric assembly can comprise an objective lens and/or a cylindrical lens. As explained above, a site of this kind can be produced by partial mirrors tilted relative to one another, for example.

According to a further advantageous configuration, the optical device can comprise a light sheet optical system which is configured to produce differently oriented light sheets. The telecentric optical assembly and/or a cylindrical lens can be part of the light sheet optical system. The partial beams are directed through the light sheet optical system. The light sheet optical system is in particular configured to produce a differently oriented light sheet from each partial beam.

The differently oriented light sheets are, in a preferred embodiment, coplanar and have different propagation directions. In other words, in this configuration the different light sheets are tilted relative to one another in a common plane. A configuration of this kind is used to reduce shadowing in the illuminated layer caused by objects in the sample.

In another configuration, the different light sheets can intersect. In particular, the optical device can comprise a sample volume, in which a sample to be inspected is arranged. In this case, the differently oriented light sheets are preferably superimposed or intersect in the sample volume.

According to a further advantageous configuration, the different light sheets can extend in parallel and so as to be spaced apart from one another. This configuration is advantageous for illuminating different layers of the sample.

According to a further advantageous configuration, the optical device can comprise a light source which is configured to produce the light beam that can be or is coupled into the reflector assembly. The light beam, in a preferred embodiment, has a coherence length that is less than the shortest length of the beam path between two successively coupled-out partial beams. This ensures that the light among the partial beams is incoherent. The reflector assembly is therefore used to produce partial beams that are incoherent with one another from an originally coherent light beam. This is equivalent to the shortest length of the beam path between successively coupled-out partial beams being greater than the coherence length of the light beam from which the partial beams are produced. The length of the beam path can be changed, for example, if at least one mirror is movable relative to at least one other mirror or if a pair of mirrors is movable relative to another pair of mirrors of the reflector assembly.

The light source can be a laser, for example a gas laser, a diode laser, or a CW laser. The light beam coupled into the reflector assembly can comprise a single light pulse or pulse sequence, or a continuous light.

A collimation optical system is intended to be located between the light source and the beam entrance of the reflector assembly.

The light beam, in a preferred embodiment, has an elliptical cross section at the beam entrance. Irrespective of this, the partial beams can have an elliptical cross section at the beam exit.

In particular if a pulsed light source is used, the partial beams can be coupled out successively. As a result, the differently oriented light sheets can, for example, likewise be produced successively by the light sheet optical system. When parallel light sheets are offset in depth, different layers can be illuminated consecutively and can be detected by a detector in an interdependent manner.

The partial beams can lie in one plane at the beam exit, thereby considerably simplifying the structure of any downstream light sheet object. In this case, the partial beams can be arranged side by side in the plane or central plane of the beam path or in a plane transverse to the plane or central plane of the beam path. The central plane is, for example, a starting plane positioned through the beam path.

The optical device can be part of a light sheet microscope and can be arranged in an illumination beam path of the light sheet microscope. The illumination beam path extends from a light source to a sample volume.

The optical device or the light sheet microscope can comprise a detector optical system, which is optionally equipped with a detector, for example an area sensor or matrix sensor. In this case, the optical axis of the detector optical system is preferably perpendicular to the optical axis of the light sheet optical system and/or perpendicular to the planes of the light sheets.

The above-described subject matter will be explained in greater detail by way of example on the basis of the accompanying drawings. In line with the above information, features reproduced in the drawings can be omitted if the respective technical effects associated with those features are not intended to be relevant to an application. Likewise, features not reproduced in the drawings can be added in line with the above information if the technical effects associated with those features are relevant to a particular application.

For the sake of simplicity, in the drawings, elements that correspond to one another in terms of function, name, or structure are each provided with the same reference sign.

First of all, the structure and function of an optical device 100 and of a retrofit kit 168 are explained on the basis of the microscope 102 shown schematically in FIG. 1. The microscope 102 is a light sheet microscope 104, for example.

The optical device 100 is arranged in an illumination beam path 160 of the microscope 102. The illumination beam path 160 extends from a light source 130 to a sample volume 154, into which a sample (not shown), for example a biological sample, that is to be inspected by the microscope 102 is placed. A detector optical system 140 comprising a light-sensitive detector 142, for example an area sensor, such as a CMOS sensor or a CCD matrix sensor, can be part of the microscope 102 or of the optical device 100. An optical axis 144 of the detector optical system 140 intersects the sample volume 154 and, in a preferred embodiment, also the illumination beam path 160. This optical axis 144 is, in a preferred embodiment, perpendicular to the illumination beam path 160.

The light source 130 can be a laser, for example a gas laser or a diode laser. The light source 130 can be pulsed, i.e., can produce light pulses 170. Depending on the configuration of the light source, the light pulses 170 can be shorter or longer. By way of example, reference sign 170a denotes a light pulse having a longer duration t. Alternatively, the light source can also output continuous light 171. For example, the light source can be a CW laser. The light source can produce coherent light having a coherence length 132.

The light source 130 produces light that propagates along the light beam 110. A collimation optical system 134, which can be part of the light source 130 or separate therefrom, is arranged in the light beam 110 in order to collimate it. The light beam 110 moves along the illumination beam path 160 and enters the optical device 100. The optical device 100 comprises a reflector assembly 106, into which the light beam 110 is coupled.

In the reflector assembly 106, the light beam 110 moves along a beam path 114. The light beam is reflected back and forth multiple times along the beam path 114, during which it passes a beam exit 112 of the reflector assembly 106 or optical device 100 multiple times. On each passage 116 of the beam exit 112, a partial beam 118 is coupled out. The partial beam 118 leaves the reflector assembly 106 and the optical device 100, and in a preferred embodiment, in the extension of the light beam 110 coupled into the reflector assembly 106.

As shown in FIG. 1 by way of example, the partial beams 118 leave the reflector assembly 106, in a preferred embodiment, in parallel and so as to be spaced apart from one another, in particular so as to be equally spaced apart from one another.

The beam exit 112 can be formed by a beam splitter 120, which is configured as a partially transmitting mirror 124, for example. A fully reflective mirror 122 is, in a preferred embodiment, opposite the partially transmitting mirror 124, in parallel therewith. Both mirrors 122, 124 are, in a preferred embodiment, planar.

At each mirror 122, 124, the beam path 114 therefore comprises a deflecting site 136, at which said beam path changes direction, each of the deflecting sites 136 being formed by a mirror 122, 124. The deflecting sites 136 are spaced apart from one another. At each mirror 122, 124, the beam path 114 is deflected to the other mirror 122, 124.

Since a refractive element, in particular a lens, is not located in the beam path 114, the light beam 110 remains collimated in the reflector assembly 106 if it was previously collimated. Likewise, all the partial beams 118 are collimated.

In the configuration shown in FIG. 1, the beam path 114 extends in a gas-filled or vacuum-filled volume 138, and in a preferred embodiment, a sealed volume of the reflector assembly 106. As an alternative, the mirrors 122, 124 can also be the opposing reflective side surfaces of a glass block.

Each partial beam 118 covers a different-length path length in the reflector assembly 106. This path length is shortest for the partial beam 118 that is coupled out first. Each partial beam 118 coupled out thereafter has an accordingly greater path length.

If the path length covered by a partial beam 118 in the reflector assembly 106 compared with a previously coupled-out partial beam 118 is greater than the coherence length 132 of the light from the light source 130, these two coupled-out partial beams are no longer coherent with one another. All the partial beams 118 are, in a preferred embodiment, incoherent with one another.

The reflector assembly 106 splits the light beam 110 into a plurality of partial beams 118, which are part of the illumination beam path 160.

The partial beams 118 enter a light sheet optical system 150 that is configured to produce differently oriented light sheets 152 from the different partial beams 118. The differently oriented light sheets 152 can extend in parallel and so as to be spaced apart from one another. In the configuration shown in FIG. 1, all the light sheets 152 intersect in the sample volume 154 or at a point. They have different propagation directions. If all the partial beams 118 from which light beams are produced lie in one plane 500, the light sheets emerging from the light sheet optical system 150 are coplanar. The optical axis 144 of the detector optical system 144 is perpendicular to the light sheets 152. An optical axis 154 of the light sheet optical system, in a preferred embodiment, extends perpendicularly to the optical axis 144 of the detector optical system 140.

The light sheet optical system 150, in a preferred embodiment, comprises a cylindrical lens 128 and an objective lens 126 and/or a telecentric optical assembly 126.

If the light beam 110 is a light pulse 170, 170a, the partial beams 118 are also partial light pulses 172 or 172a, the duration of the light pulses 170, 170 of the light beam 110 being the same as the duration of the partial light pulses 172, 172a. By contrast, a continuous light beam 171 results in a continuous partial beam 173. The light intensities of the partial light beams 118 are, of course, each lower than the light intensity of the light beam 110.

If the light beam 110 is a light pulse 170, 170a, the different path lengths of the partial beams 118 in the reflector assembly 106 mean that the partial light pulses 172, 172a forming the partial beams 118 are coupled out of the reflector assembly 106 successively. In this case, a duration 174 between successively coupled-out partial beams 118 can be greater than the pulse duration of the individual light pulses 172. The light sheets 152 produced from the partial beams 118 are accordingly produced successively and in particular so as not to overlap in time.

The path length differences in the reflector assembly 106 can be adapted to the respective requirements, for example to a coherence length 132 or a required time interval 174, by simply adjusting the spacing between the two mirrors 122, 124 and/or by adjusting the angle of incidence 146 at which the light beam 110 impinges on the relevant mirror 122, 124 at the beam entrance 108. To do this, the reflector assembly 106 can be tilted as a whole, for example.

It should be noted that, in FIG. 1, the light beam 110 impinges on the beam splitter 120 or the partially transmitting mirror 124 at the beam entrance 108. The first coupled-out partial beam 118 is thus not reflected, but passes directly through the beam splitter 120. It goes without saying that the light beam 110 can instead also impinge on the mirror 122. In this case, the partial beams 118 emerge from the reflector assembly 106 in a direction rotated by 180°, which results in a more compact form.

The transmissivity of the partially transmitting mirror 124 or beam splitter 120 can be spatially variable so that each coupled-out partial beam has the same intensity. In particular, the transmissivity can increase, in particular double, proportionally to the number of passes.

The light beam 110 and each partial beam 118, in a preferred embodiment, have an elliptical cross section.

In the reflector assembly 106, after each passage 116 of the beam splitter 120 or the beam exit 112, all the deflecting sites 136 of the reflector assembly 106 have been passed since the previous passage 116.

FIG. 11 schematically shows a further configuration of the optical device. This configuration has a slightly modified structure compared with that shown in FIG. 1. The above information relating to FIG. 1 is also applicable to the optical device shown in FIG. 11, except for the differences that are explicitly mentioned in the following.

In comparison with FIG. 1, the light source 130 is arranged in a different position. This does not change the functioning of the light source 130, and in particular does not change the production of the partial beams 118.

In the configuration shown in FIG. 11, the lens 128 can be supplemented with a further lens and can thus form a telescope 128a. The telescope 128a and the objective lens 126 and/or the telecentric optical assembly 126 form the light sheet optical system 150.

The beams can have an elliptical cross section, with a short axis of the ellipse pointing in the same direction as that in which the partial beams 118 are also spaced apart.

The elliptical beams can be produced, for example, by means of a telescope made up of two cylindrical lenses between the light source 130 and the reflector assembly 106.

Each partial beam 118 can be given an elliptical cross section by a suitable optical system.

Provided that the partial beams 118 have an elliptical profile, the cylindrical lens 128 in FIG. 1 can be omitted or configured as a telecentric telescope 128a, as schematically shown in FIG. 11.

FIGS. 8 and 9 show a variant of the optical device 100 or reflector assembly 106 in FIG. 1, in which the reflector assembly 106 is manufactured from, in a preferred embodiment, a monolithic glass block 800. The mirrors 122 are formed at reflective surfaces 802 of the glass block 800, and the beam splitter 120 or partially transmitting mirror 124 is formed at a partially transmitting surface 804. Otherwise, the function and structure do not differ from the reflector assembly 106 in FIG. 1.

In FIG. 1, the path length 162 of each pass from beam exit 112 to beam exit 112 is relatively short and, in a preferred embodiment, identical for each pass. If the light from the light source 130 has a long coherence length 132, in some circumstances the path length difference covered by two partial beams 118 coupled out successively in the beam path 114 is not sufficient to produce partial beams 118 that are incoherent with one another. In that case, a reflector assembly 106 having a longer beam path 114 may be preferred.

FIGS. 2 to 7 and 10 show reflector assemblies 106 that have longer beam paths 114 and are therefore suitable for light sources having long coherence lengths 132. For the sake of conciseness, only the differences from the preceding configurations are discussed in the following. Unless explicitly stated otherwise, the explanations regarding the other configurations therefore also apply to these configurations.

In the configuration in FIG. 2, the reflector assembly 106 comprises four mirrors 122, 124, with one mirror 124 being partially transmitting and forming the beam exit 112 in the form of a beam splitter 120.

The beam entrance 108 is again arranged at the beam splitter 120 merely by way of example, but it can also be located at any other mirror 122. In that case, however, the partial beams 118 are not coupled out in the extension of the light beam 110 coupled into the reflector assembly, but rather at an angle of 90°, 180°, 270°, or 360°, for example, relative to the light beam 110.

FIG. 2 shows a pass or circulation 200 of the beam path 114 from beam exit 112 to beam exit 112 in dashed lines for illustration purposes. Portions 202 of the beam path 114 between two identical, successive deflecting sites 136 are each offset in parallel with one another and have different lengths.

The mirrors 122 can be retroreflectors, for example triple prisms. It goes without saying that single mirrors or prisms can also be used. The volume 138 is filled with gas or is a vacuum.

The reflector assembly 106 in FIG. 3 has the same basic beam geometry, in particular the same beam entrance 108 as the configuration in FIG. 2, but the reflector assembly 106 in FIG. 3, similarly to FIGS. 8 and 9, is formed by a glass block 800 which comprises reflective surfaces 802. The beam path 114 extends fully in the glass block 800. To couple the light beam into the glass block 800, a beam splitter 120, which can be part of the glass block 800 or a separate element, is used on the beam path 114. The surface 804 of the glass block 800 is partially reflective at the beam exit 112 such that a beam splitter is formed there.

The drawback of using a glass block 800 as in the configuration in FIG. 3 instead of separate mirrors 122, 124 as in the configuration in FIG. 2 is that it is no longer possible to adjust the beam path 114. For example, according to FIG. 2, at least one mirror 122 or one pair of mirrors 122, 124 can be adjustable relative to at least one of the other mirrors 122, 124 in an adjusting direction 204 in order to change the length of the beam path and/or the position and/or number of at least some partial beams. For instance, the length of the beam path 114 can be changed if a pair of adjacent mirrors is moved away from the opposite pair of mirrors. The position and/or number of the partial beams 118 can be changed by displacing a mirror. The orientation of the partial beams 118 can be adjusted by tilting one or more mirrors 122, 124.

A mirror 122 can be adjusted manually or by a motor in the adjusting direction 204.

In the embodiment in FIGS. 4 and 5, the beam splitter 120 is located centrally in the beam path 114 and no longer on one of the mirrors 122 at the corners of the beam path 114. In this configuration, it is possible to bring about the position of the partial beams 118 by changing the position of the beam splitter 120. In this case, for example, the adjusting direction 204 extends in parallel with the longitudinal direction of the portion 202 of the beam path in which the beam splitter 120 is located. Alternatively or additionally, at least one mirror 122 can also be displaceable in an adjusting direction 204 in parallel with the beam path 114 before or after the deflecting site 136 formed by the mirror 122 in each case.

In the configurations in FIGS. 1 to 5, the partial beams 118 each lie in the plane 500 in which the beam path 114 also lies. The beam path and the partial beams 118 are coplanar. All the deflecting points 136 lie in the plane in which the partial beams 118 also lie. The plane 500 can be a central plane or a correction plane of the beam path 114.

Figure 7:
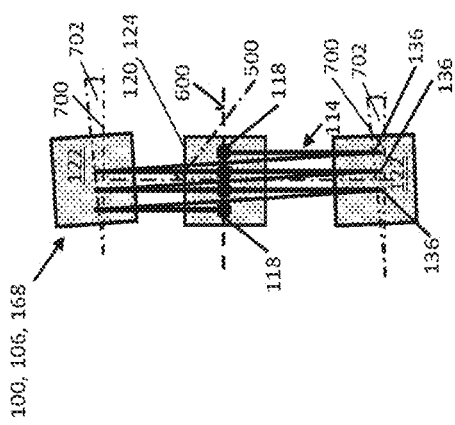
FIG. 7 is a view of FIG. 6 in the direction of the arrow VII.
Figure 6:
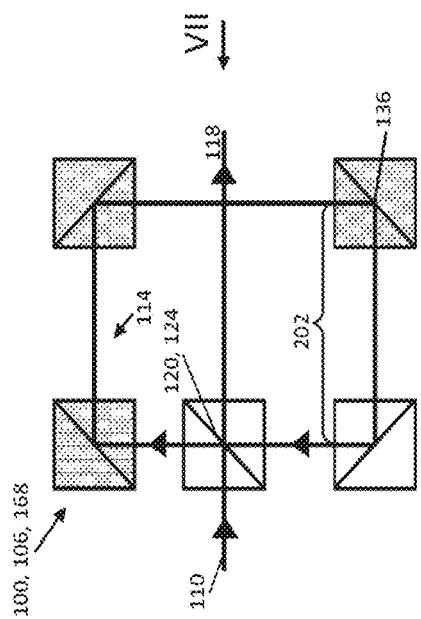
FIG. 6 is a schematic illustration of a further optical device.

Depending on the orientation of the light sheet optical system 150 (FIG. 1) and the available space, it may be necessary for the partial beams 118 to lie in a plane 600 that lies substantially perpendicularly to the plane 500 of the beam path 114. A configuration of this kind is shown in FIGS. 6 and 7. An arrangement of the partial beams 118 in a plane 600 perpendicular to the plane of the beam path 114 is made possible by tilting two mirrors 122 of the reflector assembly 106 in the same spatial direction 700 by the same angle 702. In this case, the spatial direction 700 is perpendicular to the plane 500 of the beam path 114.

In the embodiments in FIGS. 1 to 7, the partial beams leave the reflector assembly 106 in a manner spaced apart from one another, in a preferred embodiment equally spaced apart from one another, and in parallel with one another. Depending on the light sheet optical system 150 used, however, it may be desirable for the partial beams 118 that leave the reflector assembly 106 to start from a common point 1000, as shown in FIG. 10. In this case, the light beam 110 is preferably collimated in the same way as the partial beams 118.

The common point 1000 is, in a preferred embodiment, in the beam path 114 and forms a site 1002 or ideally a point which is passed on each pass of the light beam through the reflector assembly 106. The common point 1000 can be located at a mirror 122, at the beam splitter 120, or at another point in the reflector assembly 106. In principle, it is also possible for the common point 1000 to be located beyond the beam exit 112, i.e., outside the reflector assembly 106. The common point 1000 is, in a preferred embodiment, located in the back focal plane 100 or in a plane of the light sheet optical system 150 optically conjugated relative thereto.

A beam path 114 having a beam path running up to a common point 1000 or having partial beams diverging from the common point 1000 can, for example, be obtained in that a mirror 122 contains a mirror assembly 1004 comprising a plurality of partial mirrors 1006 that are tilted relative to one another about a spatial axis 1010. Each pass 200 of the beam path 114 impinges on a different partial mirror 1006. All the partial mirrors 1006 are directed toward the common point 1000.

In this case, the partial beams 118, in a preferred embodiment, again lie in one plane 500. In this respect, the tilting of the mirrors in the configuration in FIGS. 6 and 7 can also be used in the configuration in FIG. 10 to change the orientation of the plane 500 in which the partial beams 118 are arranged.

In FIG. 10, the beam splitter 120 can be arranged at any site in the beam path 114. In the same way as the arrangement in FIGS. 1 to 9, the arrangement in FIG. 10 has the advantage whereby the partial beams 118 emerge from the reflector assembly 106 in the extension of the light beam 110. If the beam splitter 120 is positioned at a different site in the beam path 114, the orientation of the partial beams 118 relative to the light beam 110 can be changed as desired.

In the same way as the reflector assembly 106 in FIG. 3, the reflector assembly 106 in FIG. 12 has the same basic beam geometry, in particular the same beam entrance 108 as the configuration in FIG. 2. In comparison with the reflector assembly 106 in FIG. 3, the reflector assembly 106 in FIG. 12 has been modified solely with regard to the beam splitter 120.

FIGS. 13 and 14 show a further variant of the optical device 100 or reflector assembly 106 in FIG. 1, in which the reflector assembly 106 is manufactured from, in a preferred embodiment, a monolithic glass block 800. This variant has only been slightly modified compared with that shown in FIGS. 8 and 9.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Optical device
102 Microscope
104 Light sheet microscope
106 Reflector assembly
108 Beam entrance
110 Light beam
112 Beam exit
114 Beam path in the reflector assembly
116 Passage of the beam path past the beam exit
118 Partial beam
120 Beam splitter
122 Mirror
124 Mirror
126 Objective lens and/or telecentric optical assembly
128 Cylindrical lens
128a Telecentric telescope 130 Light source
132 Coherence length
134 Collimation optical system
136 Deflecting site
138 Volume
140 Detector optical system
142 Detector
144 Optical axis of the detector optical system
146 Angle of incidence
150 Light sheet optical system
152 Light sheet
153 Common plane of the light sheets
154 Sample volume
156 Optical axis of the light sheet optical system
158 Propagation direction of the light sheets
160 Illumination beam path
162 Path length of a pass
168 Retrofit kit
170, 170a Light pulse
171 Continuous light beam
172, 172a Partial light pulse
173 Continuous partial beam
174 Delay
200 Pass through or circulation in the reflector assembly
202 Portion of the beam path between two deflecting sites
204 Adjusting direction
500 Plane of the beam path
600 Plane of the partial beams
700 Spatial direction
702 Tilt angle of a mirror in the spatial direction
800 Glass block
802 Reflective surface
804 Partially reflective surface
1000 Common starting point
1002 Site commonly passed in the beam path
1004 Mirror assembly
1006 Partial mirror
1010 Spatial axis
1012 Back focal plane of the telecentric optical assembly

The invention claimed is:

1. An optical device for a microscope, the optical device comprising:
   a reflector assembly comprising a beam entrance, at which a light beam can be coupled into the reflector assembly, comprising a beam exit, and comprising a beam path extending within the reflector assembly, wherein the beam path begins in the reflector assembly at the beam entrance and passes the beam exit multiple times, wherein, on each passage of the beam path, a partial beam is coupled out of the reflector assembly at the beam exit, and wherein the partial beams coupled out at the beam exit either extend in parallel and so as to be spaced apart from one another or are directed out of the reflector assembly starting from a common starting point; and
   a light sheet optical system through which the partial beams are directed and which is configured to produce a differently oriented light sheet from each partial beam.

2. The optical device according to claim 1, wherein a beam splitter is located at the beam exit.

3. The optical device according to claim 1, wherein the reflector assembly comprises at least two mirrors.

4. The optical device according to claim 1, wherein the beam path passes through the reflector assembly multiple times, wherein the beam path passes the beam exit once on each pass and wherein the passes are spaced apart from one another at least in some portions.

5. The optical device according to claim 4, wherein the beam path comprises at least one site which the beam path passes on each pass and which forms the common starting point.

6. The optical device according to claim 1, wherein the reflector assembly comprises at least one mirror assembly, which comprises partial mirrors that are tilted relative to one another.

7. The optical device according to claim 6, wherein the beam path is reflected by a different partial mirror on each pass.

8. The optical device according to claim 6, wherein the partial mirrors are tilted about spatial axes that are parallel to one another.

9. The optical device according to claim 1, wherein the optical device comprises a telecentric optical assembly, the common starting point of the coupled-out partial beams being positioned in a back focal plane of the telecentric optical assembly or in a plane optically conjugated relative thereto.

10. The optical device according to claim 1, wherein the partial beams lie in one plane.

11. The optical device according to claim 1, wherein the optical device comprises a light source which is configured to produce the light beam and wherein the light beam has a coherence length that is less than a shortest length of the beam path between two successively coupled-out partial beams.

12. The optical device according to claim 1, wherein the differently oriented light sheets intersect.

13. A light sheet microscope comprising the optical device according to claim 1, which is arranged in an illumination beam path, which extends from a light source to a sample volume.

14. A retrofit kit for a light sheet microscope, wherein the retrofit kit comprises the optical device according to claim 1, which is configured such that the optical device can be arranged in an illumination beam path of the light sheet microscope.

15. A method for producing lights sheets in a light sheet microscope, comprising:
   using, in the light sheet microscope, a reflector assembly comprising a beam entrance, a beam exit, and a beam path which is located in the reflector assembly, begins at the beam entrance, and passes the beam exit multiple times, wherein, on each passage of the beam exit, a partial beam is coupled out of the reflector assembly, wherein the partial beams coupled out at the beam exit either extend in parallel and so as to be spaced apart from one another or start from a common apparent starting point; and
   using, in the light sheet microscope, a light sheet optical system through which the partial beams are directed and which is configured to produce a differently oriented light sheet from each partial beam.

16. A method for automatically producing light sheets having different orientations from a light beam, wherein the method comprises the following method steps:
   coupling the light beam into a reflector assembly,
   reflecting the light beam in the reflector assembly multiple times, wherein the light beam impinges multiple times on a beam exit of the reflector assembly, where the light beam is reflected back into the reflector assembly in part, coupling each partial beam directed out of the reflector assembly out of the light beam reflected in the reflector assembly at the beam exit when the light beam impinges on the beam exit in the reflector assembly, wherein either the coupled-out partial beam extends in parallel with and so as to be spaced apart from a previously coupled-out partial beam or the coupled-out partial beam and a previously coupled-out partial beam start from a common starting point, and producing the differently oriented light sheets from the coupled-out partial beams using a light sheet optical system through which the partial beams are directed and which is configured to produce the differently oriented light sheet from each partial beam.

17. The method according to claim 16, wherein the light beam and the partial beams are light pulses and the differently oriented light sheets are produced consecutively from successive partial beams.

18. The optical device according to claim 1, wherein the microscope is a light sheet microscope.

\* \* \* \* \*